United States Patent
Nagamiya

(10) Patent No.: US 7,567,427 B2
(45) Date of Patent: Jul. 28, 2009

(54) MONOLITHIC CERAMIC ELECTRONIC COMPONENT

(75) Inventor: Katsumori Nagamiya, Izumo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/249,029

(22) Filed: Oct. 10, 2008

(65) Prior Publication Data

US 2009/0103237 A1    Apr. 23, 2009

(30) Foreign Application Priority Data

Oct. 18, 2007  (JP) .............................. 2007-270914

(51) Int. Cl.
*H01G 4/06* (2006.01)
(52) U.S. Cl. .............. 361/321.2; 361/321.1; 361/301.4; 361/308.1; 361/306.1; 361/306.3
(58) Field of Classification Search .............. 361/321.2, 361/321.1, 321.4, 301.2, 301.4, 308.1, 309, 361/311–313, 306.1, 306.3
See application file for complete search history.

(56) References Cited

U.S. PATENT DOCUMENTS

| | | | |
|---|---|---|---|
| 5,583,738 A | | 12/1996 | Kohno et al. |
| 6,212,060 B1 * | | 4/2001 | Liu .............................. 361/329 |
| 6,515,842 B1 * | | 2/2003 | Hayworth et al. ............ 361/303 |
| 6,657,848 B2 * | | 12/2003 | Togashi et al. ............ 361/306.3 |
| 6,762,925 B2 * | | 7/2004 | Uchida et al. ............. 361/321.1 |
| 6,934,145 B2 * | | 8/2005 | Hsieh et al. ............... 361/321.2 |
| 7,050,288 B2 * | | 5/2006 | Ahiko et al. ................. 361/303 |
| 7,084,732 B2 * | | 8/2006 | Krumphals ............... 338/22 R |
| 7,262,952 B2 * | | 8/2007 | Lee et al. .................. 361/306.3 |

OTHER PUBLICATIONS

Nagamiya et al.: "Capacitor Array and Method for Manufacturing the Same," U.S. Appl. No. 12/249,032, filed Oct. 10, 2008.

* cited by examiner

*Primary Examiner*—Nguyen T Ha
(74) *Attorney, Agent, or Firm*—Keating & Bennett, LLP

(57) ABSTRACT

A monolithic ceramic electronic component includes a ceramic laminate which includes a plurality of stacked ceramic layers and which has a first principal surface, a second principal surface opposed to the first principal surface, a first side surface, and a second side surface opposed to the first side surface, first external terminal electrodes arranged on the first side surface, second external terminal electrodes arranged on the second side surface, first internal electrodes arranged in the ceramic laminate, and second internal electrodes arranged in the ceramic laminate. The first internal electrodes include first opposed portions, first lead portions, and first projecting portions. The second internal electrodes include second opposed portions, second lead portions, and second projecting portions.

7 Claims, 10 Drawing Sheets

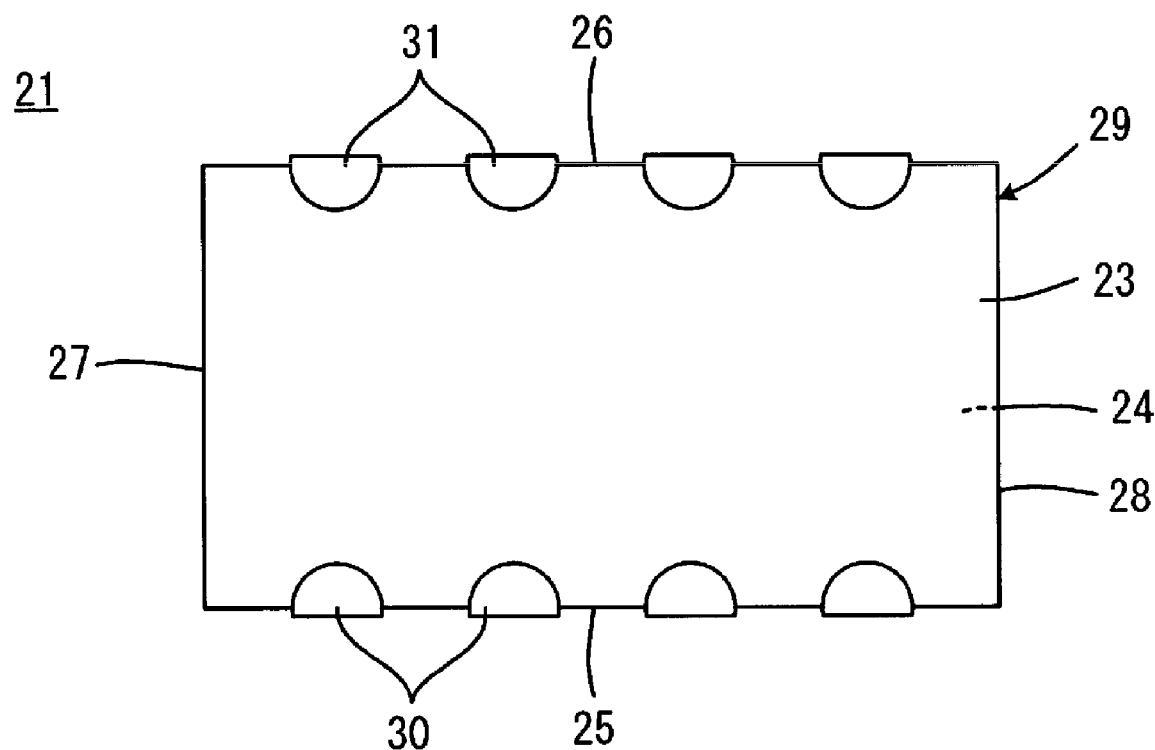

MONOLITHIC CERAMIC ELECTRONIC COMPONENT

BACKGROUND OF THE INVENTION

1. Field of the Invention

The present invention relates to monolithic ceramic electronic components, and particularly to a technique to prevent structural defects caused by internal stress from occurring in a monolithic ceramic electronic component.

2. Description of the Related Art

Monolithic ceramic electronic components include ceramic laminates including stacked ceramic layers and internal electrodes extending therebetween. During manufacture of the monolithic ceramic electronic components, each ceramic laminate is prepared using a firing step. In the firing step, the ceramic layers and the internal electrodes are co-fired. Structural defects, such as cracks, may occur in the ceramic laminate in the firing step because of the difference in sintering shrinkage between a ceramic material included in the ceramic layers and a metal included in the internal electrodes. This phenomenon is described below in detail with reference to a monolithic ceramic capacitor.

The monolithic ceramic capacitor includes ceramic layers made of $BaTiO_3$ and internal electrodes made of Ni. As compared to $BaTiO_3$, Ni has a greater thermal shrinkage. During cooling of the fired ceramic layers and internal electrodes to room temperature, the ceramic layers shrink at a relatively low rate and the internal electrodes shrink at a relatively high rate.

The ceramic layers and the internal electrodes are combined with each other and therefore cannot shrink separately. Thus, the shrinkage of each ceramic layer is greater than the intrinsic shrinkage thereof. This produces a compression stress on the ceramic layer. On the other hand, the shrinkage of each internal electrode is less than the intrinsic shrinkage thereof. This produces a tensile stress on the internal electrode. The compression and tensile stresses remain in the ceramic laminate as internal stresses which tend to cause cracks over time.

The size reduction and performance enhancement of electronic devices require that monolithic ceramic electronic components have a smaller size and an increased performance. For example, monolithic ceramic capacitors must include an increased number of thin ceramic layers and thin internal electrodes so as to have a smaller size and a greater capacitance.

The increase in the number of the ceramic layers and the internal electrodes tends to increase the internal stresses in the ceramic laminates. The internal stresses are likely to be concentrated at the boundaries between the ceramic layers and the internal electrodes, that is, at peripheral portions of the internal electrodes.

FIGS. 9A and 9B are sectional views of a capacitor array 1 disclosed in Japanese Unexamined Patent Application Publication No. 6-314634. The capacitor array 1 is an example of a conventional monolithic ceramic electronic component related to the present invention. FIGS. 9A and 9B are taken along different sections of the monolithic ceramic electronic component.

The capacitor array 1 includes a ceramic laminate 5 having a substantially rectangular parallelepiped shape. The ceramic laminate 5 includes a plurality of stacked ceramic layers 2 and has a first principal surface (not shown), a second principal surface (not shown) opposed to the first principal surface, a first side surface 3, and a second side surface 4 opposed to the first side surface surface 3. Four first external terminal electrodes 6 are arranged on the first side surface 3 of the ceramic laminate 5. Four second external terminal electrodes 7 are arranged on the second side surface 4 of the ceramic laminate 5.

The ceramic laminate 5 includes four first internal electrodes 8 each electrically connected to one of the four first external terminal electrodes 6 as shown in FIG. 9A and four second internal electrodes 9 each electrically connected to one of the four second external terminal electrodes 7 as shown in FIG. 9B.

The first internal electrodes 8 include first opposed portions 10 which are opposed to the second internal electrodes 9 with one of the ceramic layers 2 disposed therebetween and include first lead portions 11 which extend from the first opposed portions 10 to the first side surface 3 and which are electrically connected to the first external terminal electrodes 6. The second internal electrodes 9 include second opposed portions 12 which are opposed to the first internal electrodes 8 with one of the ceramic layers 2 disposed therebetween and second lead portions 13 which extend from the second opposed portions 12 to the second side surface 4 and which are electrically connected to the second external terminal electrodes 7. The widths of the first lead portions 11 and the second lead portions 13 are less than the first opposed portions 10 and the second opposed portions 12, respectively.

FIG. 10 is a partial enlarged view of the ceramic laminate 5 shown in FIG. 9A. FIG. 10 shows a portion of one of the first opposed portions 10 and one of the second lead portions 13 that is indicated by broken lines. The second opposed portions 12 overlap the first opposed portions 10.

As shown in FIG. 10, the first opposed portions 10 have first end portions 14 located on the side opposite to the first lead portions 11 and the second opposed portions 12 have second end portions 15 located on the side adjacent to the second lead portions 13. The first end portions 14 overlap with the second end portions 15. Thus, internal stresses are likely to be concentrated at the first and second end portions 14 and 15. The second lead portions 13 have first side portions 16 and second portions 17, at which internal stresses are likely to be concentrated. These elements cause internal stresses to be primarily concentrated at the corners 18 of the bases of the second lead portions 13, the corners 18 being indicated by circles in FIG. 10. Thus, cracks are likely to occur at the corners 18.

SUMMARY OF THE INVENTION

To overcome the problems described above, preferred embodiments of the present invention provide a monolithic ceramic electronic component that has a unique structure that prevents structural defects caused by internal stress from occurring.

According to a preferred embodiment of the present invention, a monolithic ceramic electronic component includes a ceramic laminate which includes a plurality of stacked ceramic layers and which has a first principal surface, a second principal surface opposed to the first principal surface, a first side surface, and a second side surface opposed to the first side surface; first external terminal electrodes arranged on the first side surface; second external terminal electrodes arranged on the second side surface; first internal electrodes arranged in the ceramic laminate; and second internal electrodes arranged in the ceramic laminate.

The first internal electrodes include first opposed portions opposed to the second internal electrodes with one of the ceramic layers disposed therebetween, first lead portions which extend from the first opposed portions to the first side surface and which are electrically connected to the first external terminal electrodes, and first projecting portions which extend from the first opposed portions toward the second external terminal electrodes arranged on the second side surface but which do not extend to the second side surface.

The second internal electrodes include second opposed portions opposed to the first internal electrodes with another one of the ceramic layers disposed therebetween, second lead portions which extend from the second opposed portions to the second side surface and which are electrically connected to the second external terminal electrodes, and second projecting portions which extend from the second opposed portions toward the first external terminal electrodes arranged on the first side surface but which do not extend to the first side surface.

The first lead portions have a width less than that of the first opposed portions. The second lead portions have a width less than the second opposed portions.

Both sides of each first projecting portion are located outside both sides of each second lead portion which is opposed to the first projecting portion with one of the ceramic layers therebetween. Both sides of each second projecting portion are located outside both sides of each first lead portion which is opposed to the second projecting portion with one of the ceramic layers therebetween.

In the monolithic ceramic electronic component, the first and second internal electrodes may preferably be alternately arranged in the direction in which the ceramic layers are stacked.

A plurality of pairs of the first and second internal electrodes may be arranged substantially in parallel to the first and second principal surfaces of the ceramic laminate. In this case, the first internal electrodes may be arranged in a single plane and the second internal electrodes may be arranged in a single plane that is different from the plane in which the first internal electrodes are arranged. Alternatively, the first and second internal electrodes may be alternately arranged in a single plane.

In the monolithic ceramic electronic component, each of the first and second projecting portions preferably has rounded corners.

Furthermore, each of the first and second opposed portions preferably have rounded corners located on the first lead portion side and the second lead portion side, respectively.

According to preferred embodiments of the present invention, the first and second internal electrodes include projecting portions in regions at which opposed portions are opposed to each other. Thus, end portions of the opposed portions are prevented from overlapping with corners of the bases of the lead portions. Both sides of each projecting portion are located outside both sides of each lead portion. Thus, both sides of the first projecting portion are prevented from overlapping with both sides of the second lead portion or the corners of the bases of one of the lead portions. These features are effective to prevent internal stresses from being concentrated at specific portions. Therefore, structural defects, such as cracks, caused by internal stresses are prevented.

The advantages of preferred embodiments of the present invention are particularly useful for, for example, monolithic ceramic electronic components, because large internal stresses remain in ceramic laminates when a plurality of first internal electrodes and a plurality of second internal electrodes are alternately arranged in the stacking direction.

In capacitor arrays, a plurality of pairs of first and second internal electrodes are arranged substantially in parallel to principal surfaces of ceramic laminates. The number of first and second internal electrodes is relatively large and a large number of surrounding portions are present around the first and second internal electrodes. This produces large internal stresses that remain in the capacitor arrays. Thus, the advantages of preferred embodiments of the present invention are particularly useful for the capacitor arrays.

When a plurality of pairs of first and second internal electrodes are arranged substantially in parallel to the principal surfaces of the ceramic laminates as described above and are alternately arranged in a single plane, the first lead portions and second lead portions provided in a specific plane are arranged close to both of the first side surface and second side surface of the ceramic laminates. Thus, junctions between adjacent ceramic layers are balanced. This enables the monolithic ceramic electronic components to have increased reliability.

When each of the first and second projecting portions have rounded corners, internal stresses are prevented from being concentrated at the corners of the first and second projecting portions.

When the first opposed portions and second opposed portions each have rounded corners located on the first lead portion side and the second lead portion, respectively, the corners of the first opposed portions are prevented from overlapping the corners of the second opposed portions. This is effective to prevent internal stresses from being concentrated at the corners of the first and second opposed portions.

Other features, elements, characteristics and advantages of the present invention will become more apparent from the following detailed description of preferred embodiments of the present invention with reference to the attached drawings.

BRIEF DESCRIPTION OF THE DRAWINGS

FIG. 2 is a plan view of the capacitor array shown in FIG. 1.

DETAILED DESCRIPTION OF PREFERRED EMBODIMENTS

First Preferred Embodiment

Figure 1:
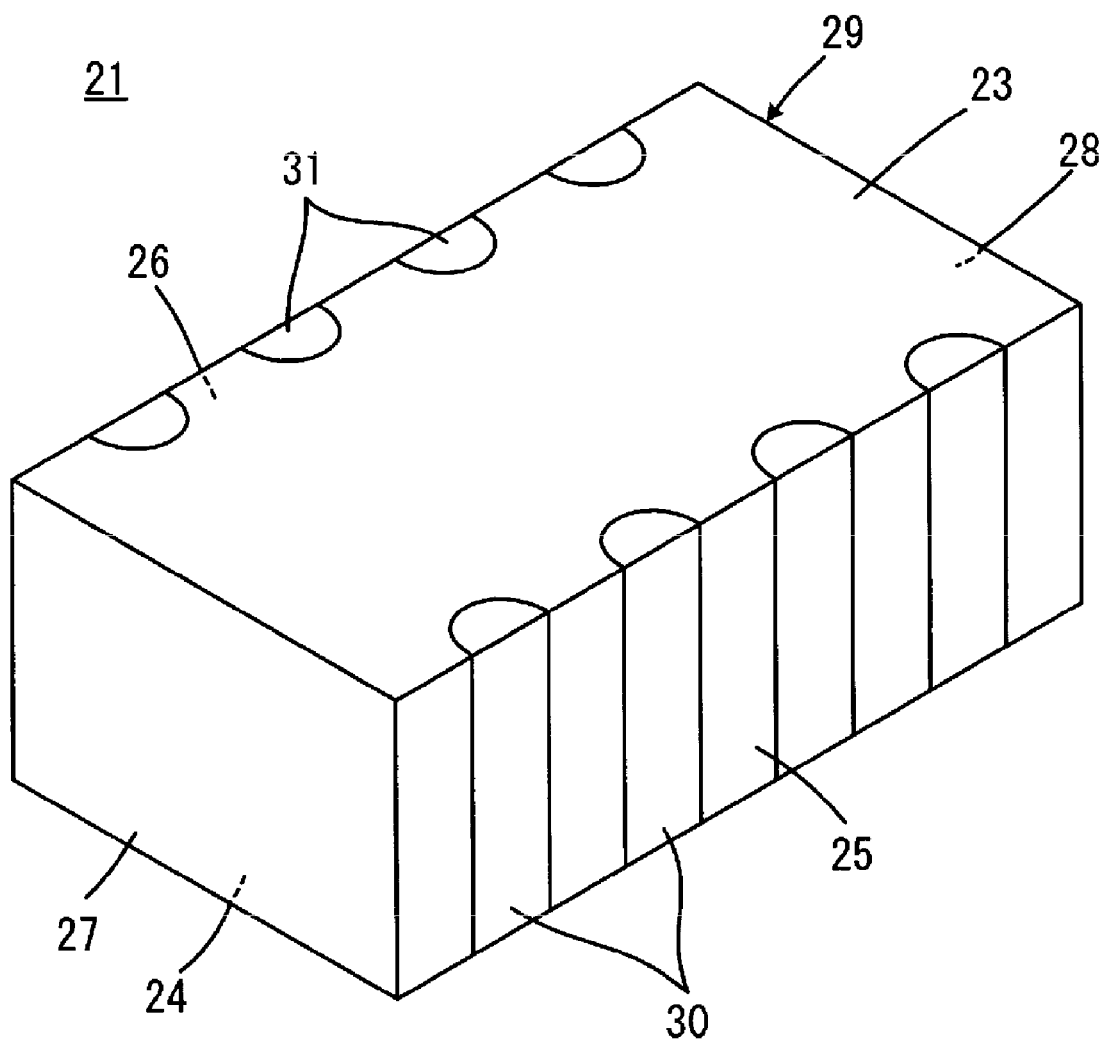
FIG. 1 is a perspective view of a capacitor array according to a first preferred embodiment of the present invention.

FIG. 1 is a perspective view of a capacitor array 21 that is an example of a monolithic ceramic electronic component according to a first preferred embodiment of the present invention. FIG. 2 is a plan view of the capacitor array 21.

Figure 3A:
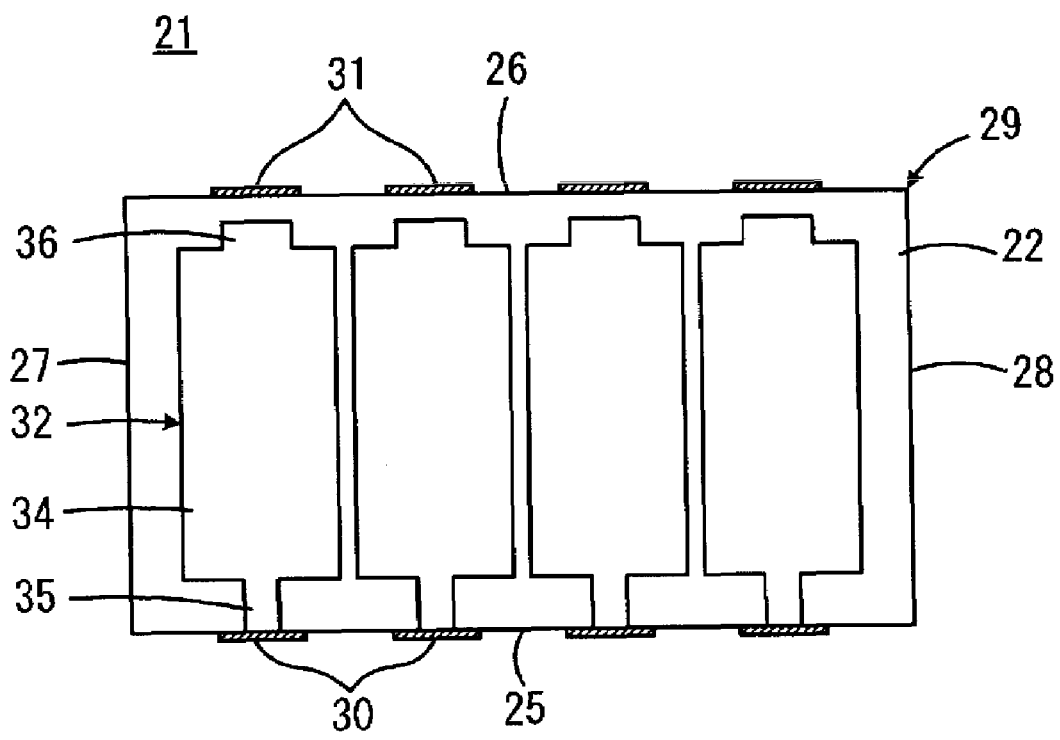
FIGS. 3A and 3B are sectional views of the capacitor array shown in FIG. 1.
Figure 3B:
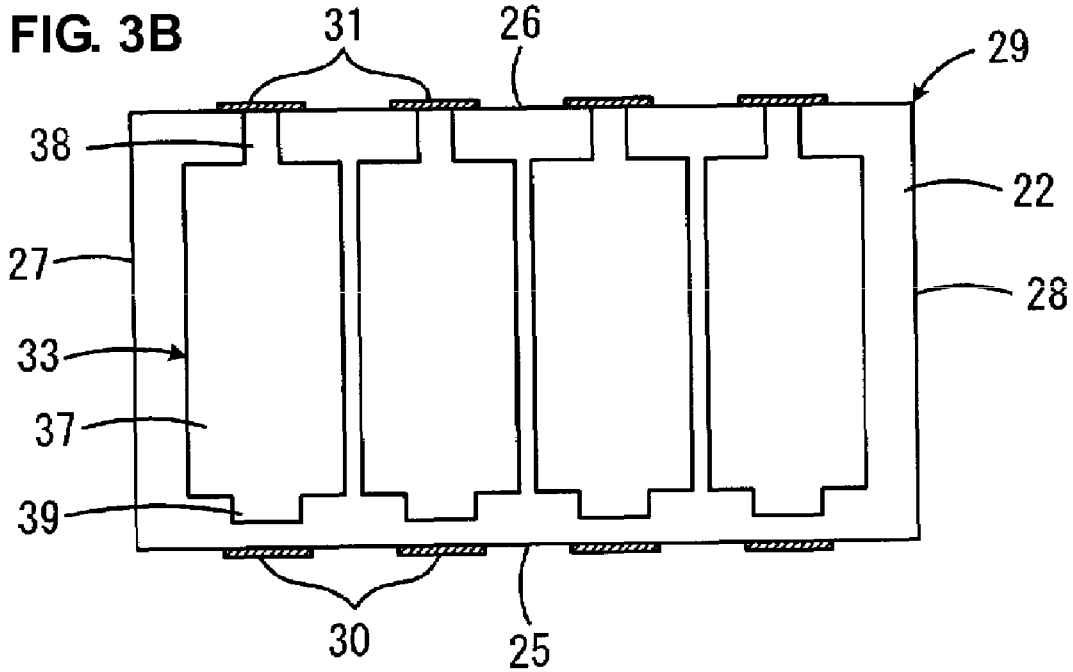

FIGS. 3A and 3B are sectional views of the capacitor array 21 taken along different sections.

The capacitor array 21 includes a ceramic laminate 29 which includes a plurality of stacked ceramic layers 22 and which preferably has a substantially rectangular parallelepiped shape. The ceramic laminate 29 includes a first principal surface 23, a second principal surface 24 opposed to the first principal surface 23, a first side surface 25, a second side surface 26 opposed to the first side surface 25, a first end surface 27, and a second end surface 28 opposed to the first end surface 27.

The ceramic layers 22 are preferably made of a dielectric ceramic material preferably including a principal component such as $BaTiO_3$, $CaTiO_3$, $SrTiO_3$, and $CaZrO_3$, for example. The dielectric ceramic material may preferably further include an auxiliary component, such as a manganese compound, an iron compound, a chromium compound, cobalt compound, or a nickel compound, for example, in addition to the principal component. The ceramic layers 22 preferably have a thickness of about 1 μm to about 10 μm, for example.

A plurality of first external terminal electrodes 30 are arranged on the first side surface 25 of the ceramic laminate 29. The number of the first external terminal electrodes 30 preferably is, for example, four. A plurality of second external terminal electrodes 31 are arranged on the second side surface 26 thereof. The number of the second external terminal electrodes 31 preferably is, for example, four.

The first and second external terminal electrodes 30 and 31 may preferably include a conductive component, such as Cu, Ni, Ag, Pd, an Ag—Pd alloy, or Au, for example. Each of the first and second external terminal electrodes 30 and 31 may preferably include a base conductive layer and a plating layer disposed on the conductive layer. The conductive layer includes a sinterable metal, such as Cu, Ni, Ag, Pd, or Au, for example. The plating layer may preferably include a metal, such as Cu, Ni, Sn, or Au, for example and may include a plurality of sublayers such as a Ni—Sn sublayer, a Ni—Au sublayer, and a Cu—Ni—Au sublayer, for example. The plating layer preferably has a thickness of about 1 μm to about 10 μm, for example. Each of the first and second external terminal electrodes 30 and 31 may preferably further include a conductive resin layer disposed between the conductive layer and the plating layer. The conductive resin layer includes a thermosetting resin, such as an epoxy resin, and a metal filler, such as Ag, for example. The first and second external terminal electrodes 30 and 31 may preferably be formed by plating.

With reference to FIGS. 3A and 3B, the ceramic laminate 29 includes first internal electrodes 32 and second internal electrodes 33. In this preferred embodiment, in order to achieve a large capacitance, the first and second internal electrodes 32 and 33 are alternately arranged in the direction in which the ceramic layers 22 are stacked. A plurality of pairs of the first and second internal electrodes 32 and 33 are arranged substantially in parallel to the first and second principal surfaces 23 and 24 of the ceramic laminate 29. The number of pairs of the first and second internal electrodes 32 and 33 is, for example, four. In this preferred embodiment, four of the first internal electrodes 32 are arranged in a single plane as shown in FIG. 3A and four of the second internal electrodes 33 are arranged in another single plane that is different from the plane in which the first internal electrodes 32 are arranged, as shown in FIG. 3B.

The first internal electrodes 32 include first opposed portions 34 opposed to the second internal electrodes 33 with one of the ceramic layers 22 disposed therebetween, first lead portions 35 which extend from the first opposed portions 34 to the first side surface 25 and which are electrically connected to the first external terminal electrodes 30, and first projecting portions 36 which extend from the first opposed portions 34 toward the second external terminal electrodes 31 arranged on the second side surface 26 but which do not extend to the second side surface 26.

The second internal electrodes 33 include second opposed portions 37 opposed to the first internal electrodes 32 with one of the ceramic layers 22 disposed therebetween, second lead portions 38 which extend from the second opposed portions 37 to the second side surface 26 and which are electrically connected to the second external terminal electrodes 31, and second projecting portions 39 which extend from the second opposed portions 37 toward the first external terminal electrodes 30 arranged on the first side surface 25 but which do not extend to the first side surface 25.

The first lead portions 35 have a width less than that of the first opposed portions 34. The second lead portions 38 have a width less than that of the second opposed portions 37.

The first and second internal electrodes 32 and 33 may preferably include a conductive component such as Ni, Cu, Ag, Pd, an Ag—Pd alloy, or Au, for example. The first and second internal electrodes 32 and 33 preferably have a thickness of about 0.5 μm to about 2.0 μm, for example.

Figure 4:
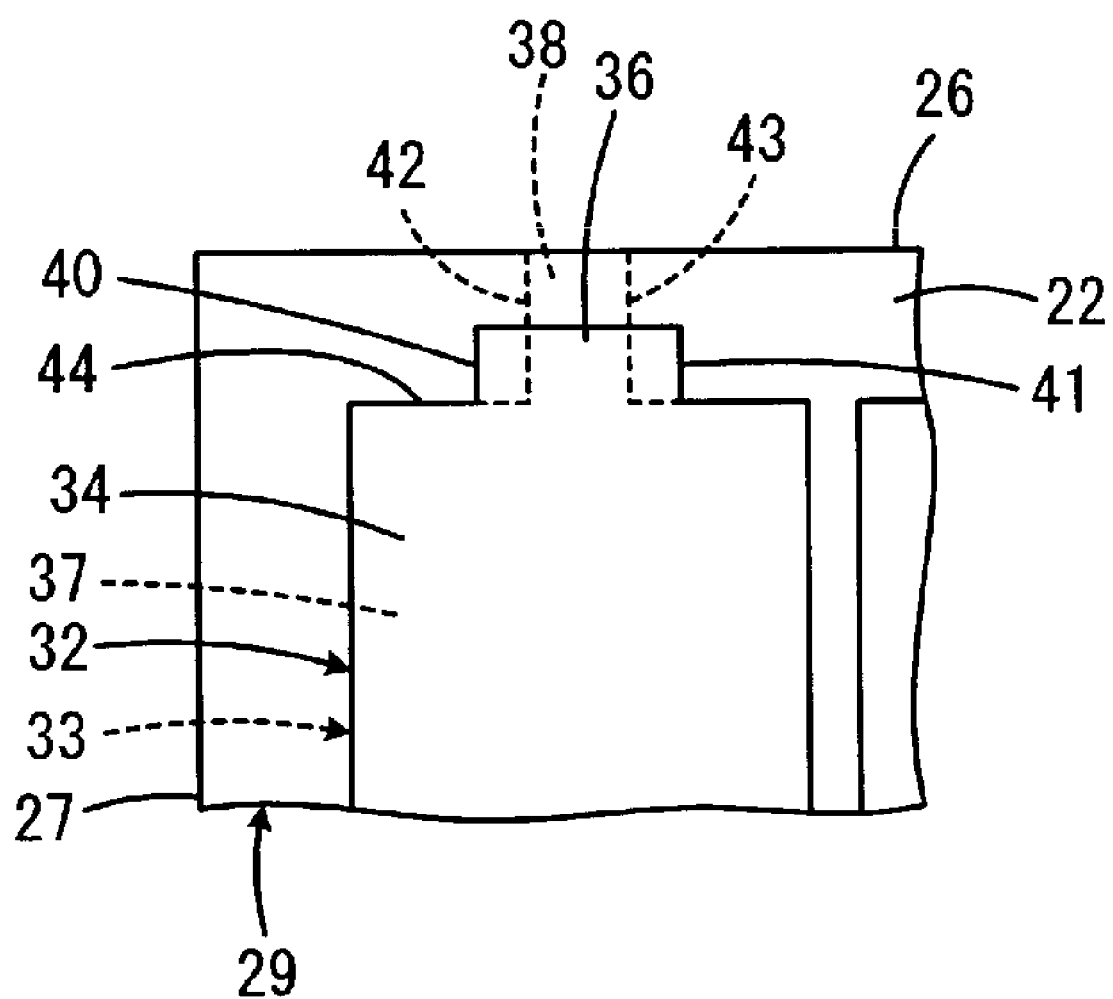
FIG. 4 is a partly enlarged view of a ceramic laminate included in the capacitor array shown in FIG. 3A.

FIG. 4 is a partial enlarged view of the ceramic laminate 29 shown in FIG. 3A. FIG. 4 shows a portion of one of the first opposed portions 34 and one of the first projecting portions 36 of the first internal electrodes 32. FIG. 4 also shows a portion of one of the second opposed portions 37 and one of the second lead portions 38 of the second internal electrodes 33 with broken lines.

With reference to FIG. 4, the first projecting portions 36 are opposed to the second lead portions 38 with the ceramic layer 22 disposed therebetween and have a first side 40 and a second side 41. The second lead portions 38 have a third side 42 and a fourth side 43. The first and second sides 40 and 41 of the first projecting portion 36 are located outside the third and fourth sides 42 and 43 of second lead portion 38. Both sides of second projecting portion 39, as well as those of the first projecting portion 36, are located outside both sides of first lead portion 35, which is not shown in FIG. 4.

With reference to FIG. 4, the first opposed portions 34 have end portions 44. Since the first internal electrodes 32 include the first projecting portions 36, the end portions 44 of the first opposed portions 34 are prevented from overlapping the corners of the bases of the second lead portions 38. Since the first and second sides 40 and 41 of the first projecting portions 36 are located outside the third and fourth sides 42 and 43 of the second lead portions 38, the first and second sides 40 and 41 of the first projecting portions 36 can be prevented from overlapping with the third and fourth sides 42 and 43 of the second lead portions 38 and also can be prevented from overlapping with the corners of the bases of the second lead portions 38.

These features are effective to prevent internal stresses from being concentrated at the corners of the bases of the second lead portions 38. The second projecting portions 39 and the first lead portions 35 have substantially the same features. Therefore, structural defects, such as cracks due to internal stresses, are prevented from occurring in the ceramic laminate 29.

A method for manufacturing the capacitor array 21 will now be described.

The following sheets and pastes are prepared: ceramic green sheets to form the ceramic layers 22, a conductive paste to form the first and second external terminal electrodes 30 and 31, and a conductive paste to form the first and second internal electrodes 32 and 33. The ceramic green sheets and the conductive pastes may preferably include a known organic binder and a known organic solvent, for example.

The conductive paste to form the first and second internal electrodes 32 and 33 is applied on some of the ceramic green sheets by, for example, a screen printing process so as to form a predetermined pattern. This enables the ceramic green sheets to have conductive paste coatings that are to be converted into the first and second internal electrodes 32 and 33.

The ceramic green sheets including the conductive paste coatings are stacked in a predetermined order. A predetermined number of the ceramic green sheets having no conductive paste coating thereon are provided on the upper surface and lower surface of the stack, whereby a green mother laminate is produced. The green mother laminate is pressed with an apparatus, such as an isostatic press, in the direction in which the ceramic green sheets are stacked, as required.

The green mother laminate is cut so as to have a predetermined size, whereby the green ceramic laminate 29 is produced.

The green ceramic laminate 29 is fired. The firing temperature of the green ceramic laminate 29 depends on a ceramic material included in the ceramic green sheets or a metal material included in the conductive paste coatings and is preferably about 900° C. to about 1,300° C., for example. An air atmosphere, a nitrogen atmosphere, a steam-nitrogen atmosphere, or other suitable atmosphere is used to fire the green ceramic laminate 29 depending on the type of a metal included in the conductive paste to form the first and second internal electrodes 32 and 33.

The conductive paste to form the first and second external terminal electrodes 30 and 31 is applied on the first and second side surfaces 25 and 26 of the fired ceramic laminate 29 and then baked, whereby the first and second external terminal electrodes 30 and 31 are formed. The baking temperature of the conductive paste to form the first and second external terminal electrodes 30 and 31 is preferably about 700° C. to about 900° C., for example. An air atmosphere, a nitrogen atmosphere, a steam-nitrogen atmosphere, or other suitable atmosphere is used to bake the conductive paste forming the first and second external terminal electrodes 30 and 31 depending on the type of a metal included in the first and second external terminal electrodes 30 and 31. The first and second external terminal electrodes 30 and 31 preferably extend from the first and second side surfaces 25 and 26, respectively, to portions of the first and second principal surfaces 23 and 24, respectively, as shown in FIGS. 1 and 2.

Plating layers are formed on the first and second external terminal electrodes 30 and 31 as required, whereby the capacitor array 21 is produced.

Second Preferred Embodiment

Figure 5A:
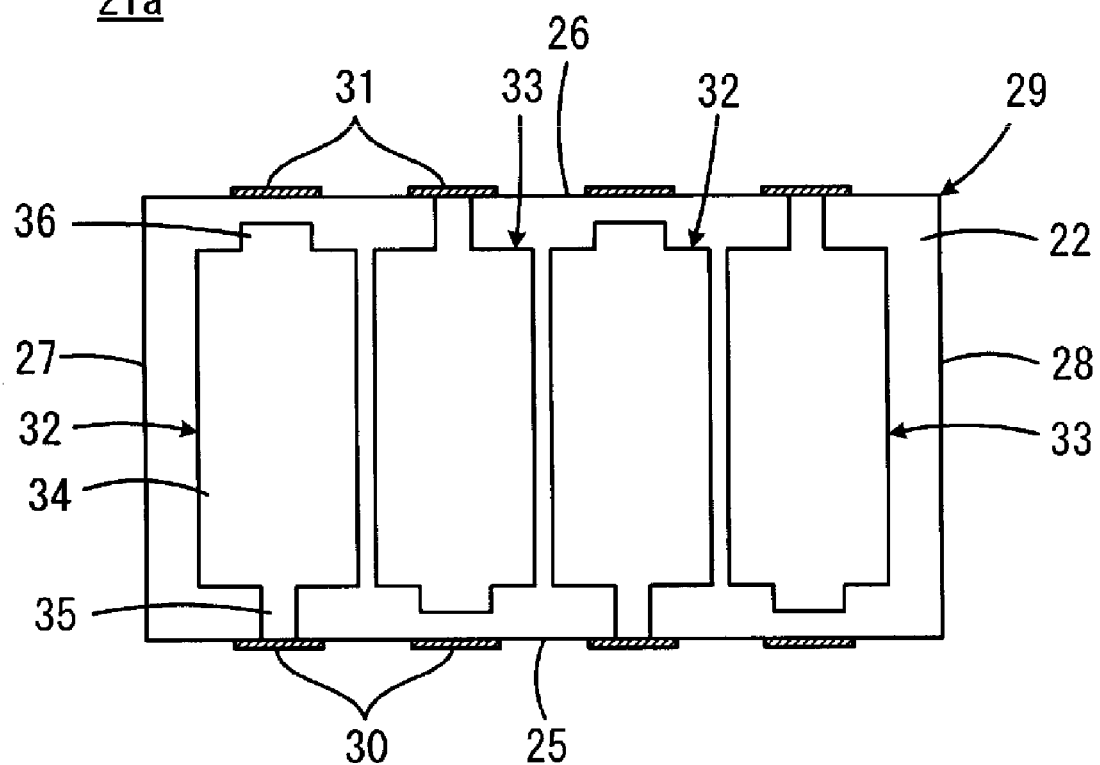
FIGS. 5A and 5B are illustrations of a capacitor array according to a second preferred embodiment of the present invention and correspond to FIGS. 3A and 3B, respectively.
Figure 5B:
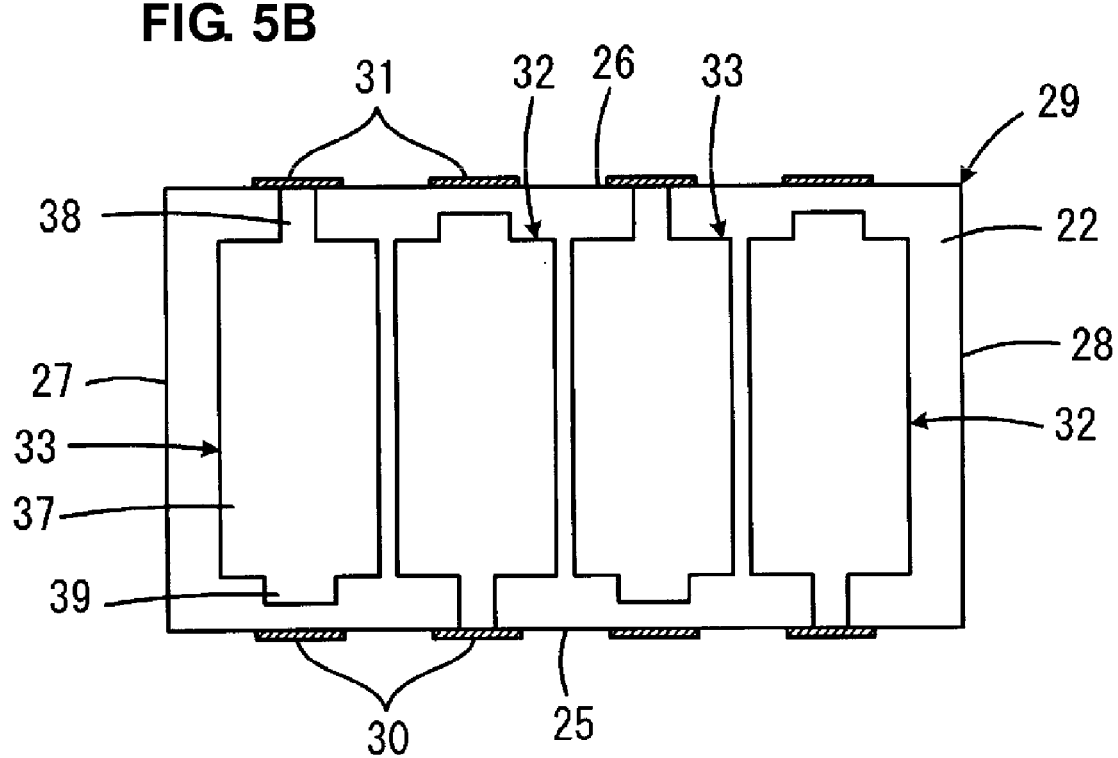

FIGS. 5A and 5B show a capacitor array 21a according to a second preferred embodiment of the present invention and correspond to FIGS. 3A and 3B, respectively. In FIGS. 5A and 5B, elements corresponding to those shown in FIG. 3A or 3B are denoted by the same reference numerals as those shown in FIG. 3A or 3B and descriptions thereof are omitted.

With reference to FIGS. 5A and 5B, in the capacitor array 21a, first internal electrodes 32 and second internal electrodes 33 are alternately arranged in a single plane. According to this configuration, the first lead portions 35 in a specific plane are arranged close to both of a first side surface 25 and the second lead portions 38 in the specific plane are arranged close to a second side surface 26. Thus, junctions between the adjacent ceramic layers 22 are balanced. This allows the capacitor array 21a to have increased reliability.

Third Preferred Embodiment

Figure 6A:
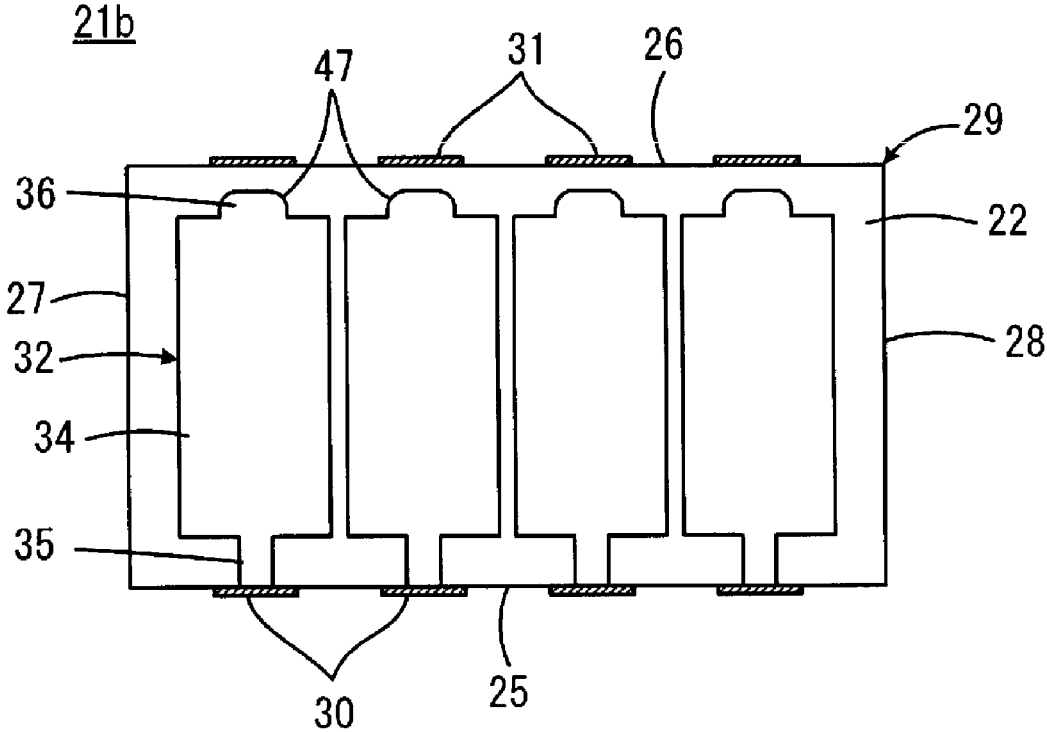
FIGS. 6A and 6B are illustrations of a capacitor array according to a third preferred embodiment of the present invention and correspond to FIGS. 3A and 3B, respectively.
Figure 6B:
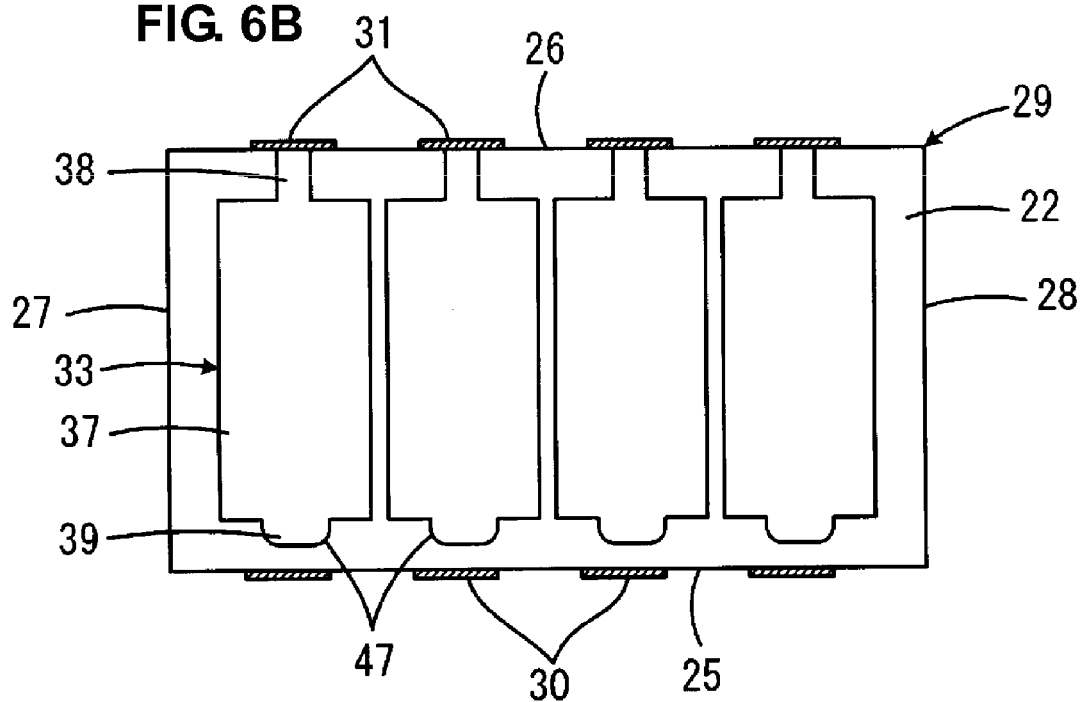

FIGS. 6A and 6B show a capacitor array 21b according to a third preferred embodiment of the present invention and correspond to FIGS. 3A and 3B, respectively. In FIGS. 6A and 6B, elements corresponding to those shown in FIG. 3A or 3B are denoted by the same reference numerals as those shown in FIG. 3A or 3B and descriptions thereof are omitted.

With reference to FIGS. 6A and 6B, in the capacitor array 21b, first projecting portions 36 and second projecting portions 39 have rounded corners 47. This configuration is effective to prevent internal stresses from being concentrated at the corners 47 of the first and second projecting portions 36 and 39.

First and second projecting portions 36 and 39 of the capacitor array 21a shown in FIGS. 5A and 5B may have rounded corners substantially identical to the corners 47.

Fourth Preferred Embodiment

Figure 7A:
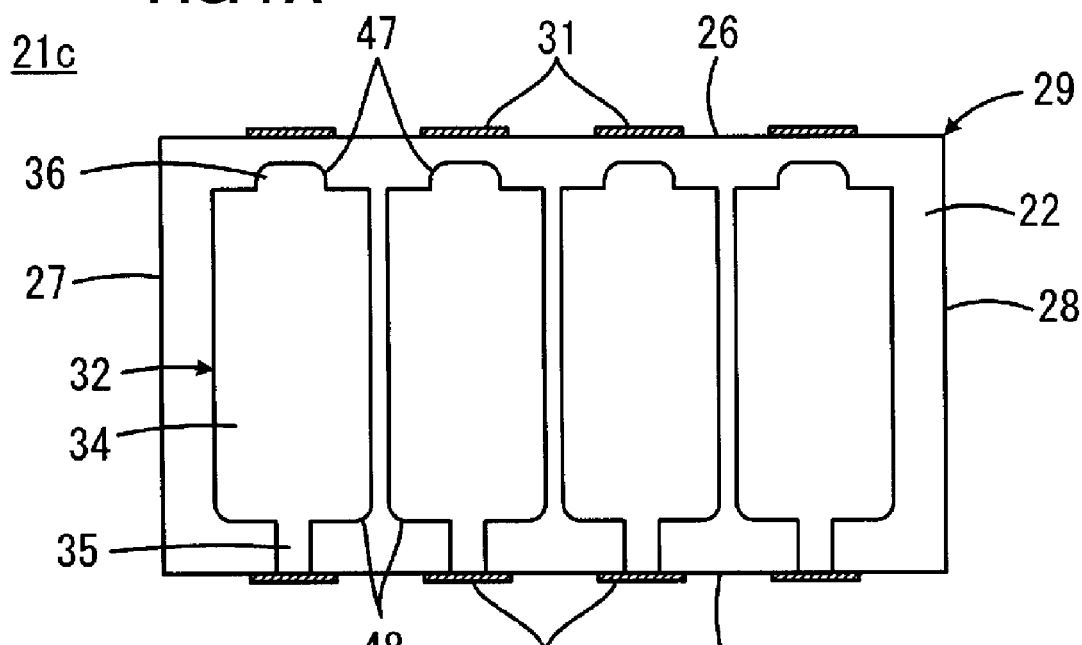
FIGS. 7A and 7B are illustrations of a capacitor array according to a fourth preferred embodiment of the present invention and correspond to FIGS. 3A and 3B, respectively.
Figure 7B:
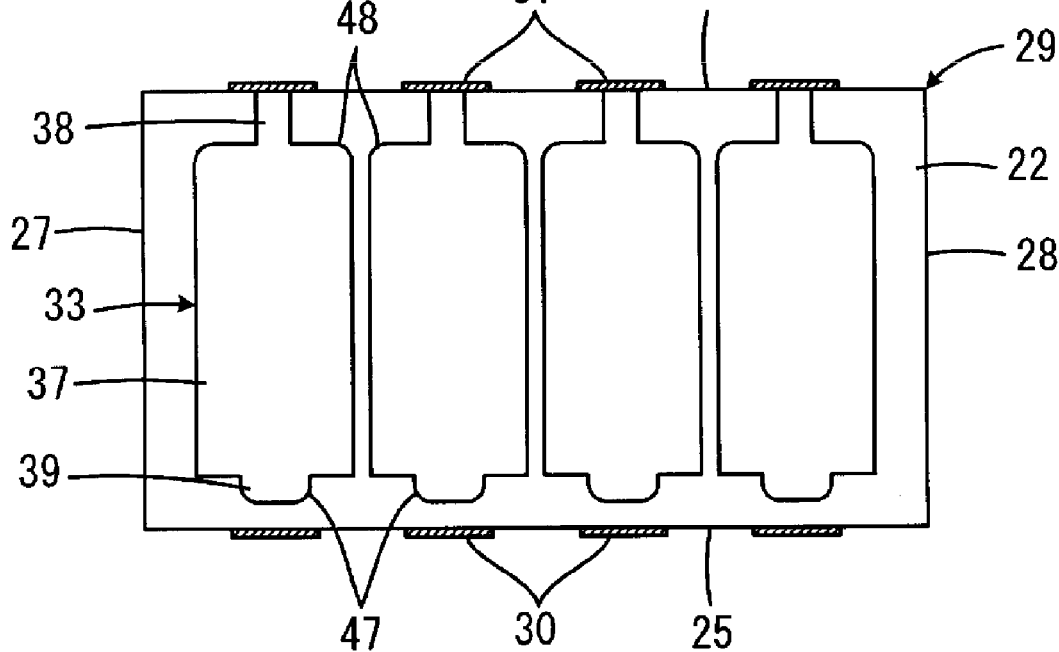
Figure 8:
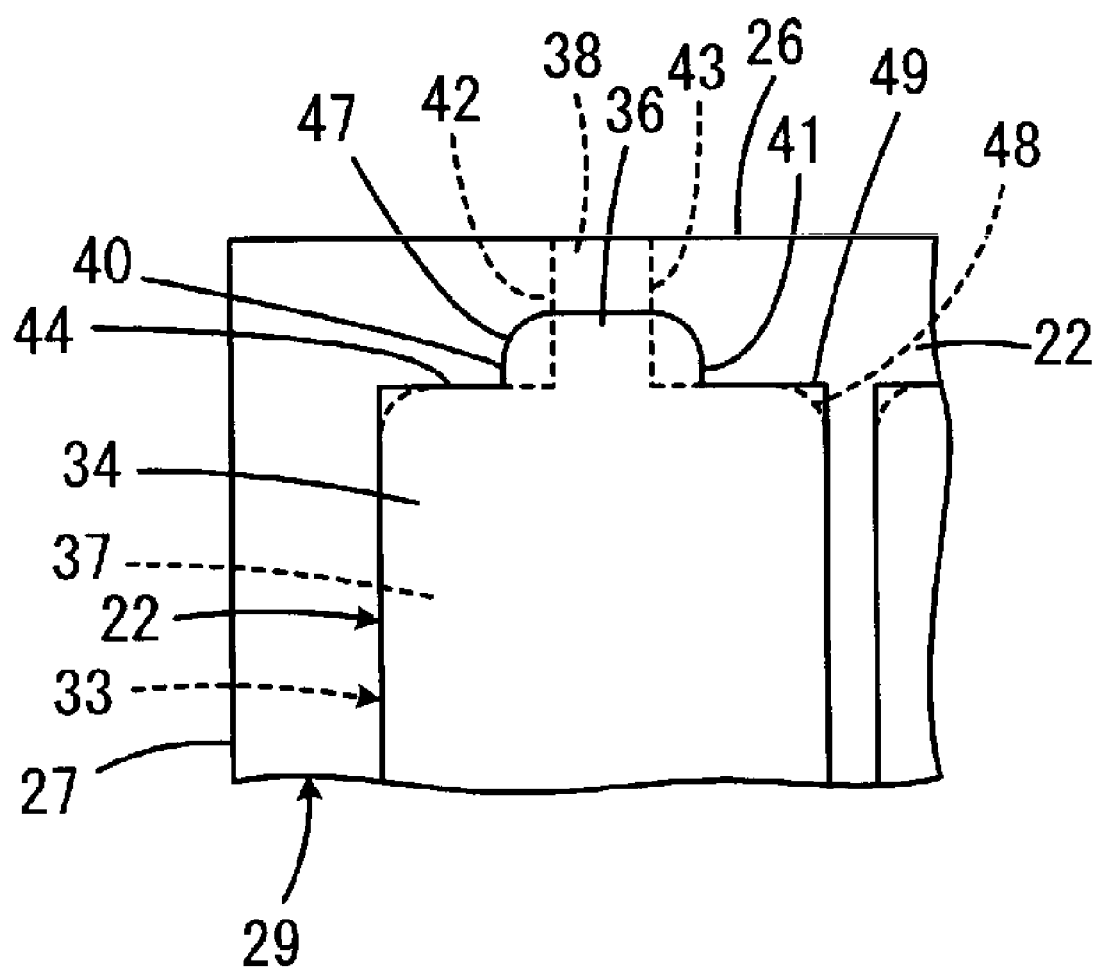
FIG. 8 is a partly enlarged view of a ceramic laminate included in the capacitor array shown in FIG. 7A.
Figure 9A:
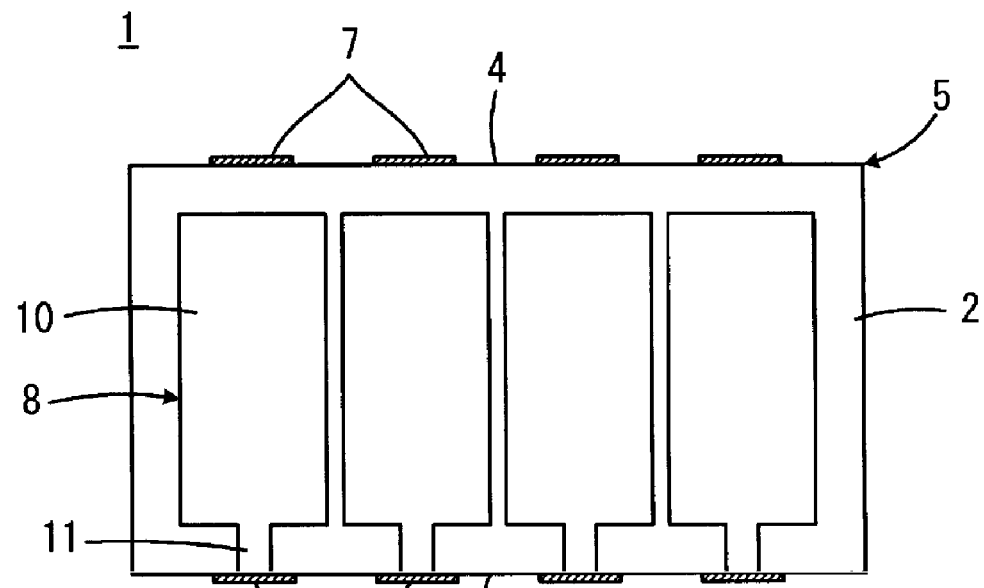
FIGS. 9A and 9B are sectional views of a conventional capacitor array related to the present invention.
Figure 9B:
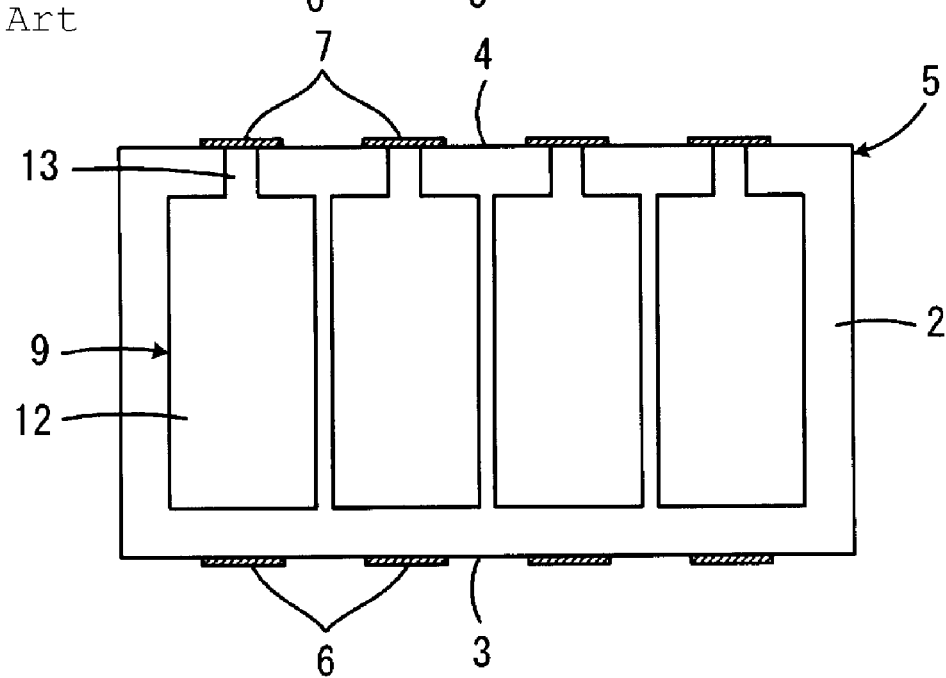
Figure 10:
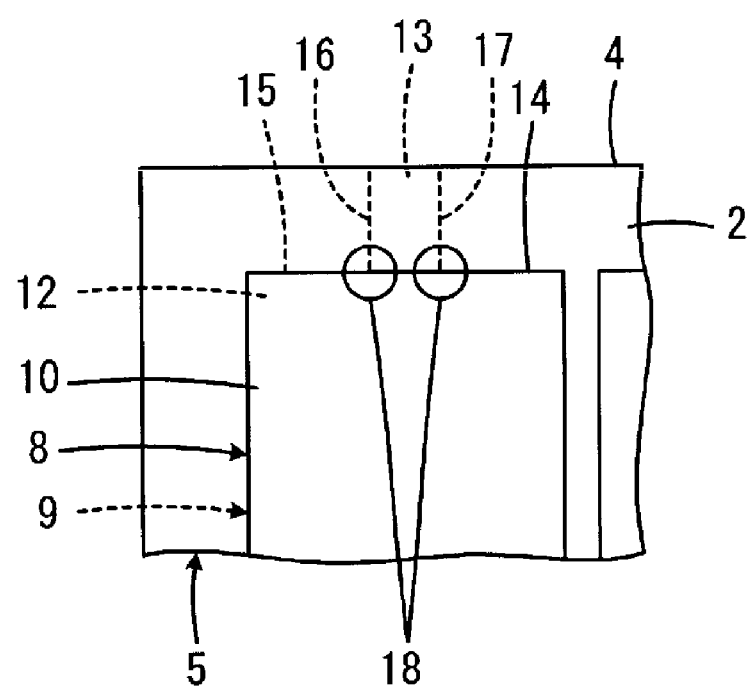
FIG. 10 is a partial enlarged view of a ceramic laminate included in the conventional capacitor array shown in FIG. 9A.

FIGS. 7A, 7B, and 8 show a capacitor array 21c according to a fourth preferred embodiment of the present invention and correspond to FIGS. 3A, 3B, and 4, respectively. In FIGS. 7A, 7B, and 8, elements corresponding to those shown in FIG. 3A, 3B, or 4 are denoted by the same reference numerals as those shown in FIG. 3A, 3B, or 4 and descriptions thereof are omitted.

In the capacitor array 21c shown in FIGS. 7A, 7B, and 8, first projecting portions 36 and second projecting portions 39 have rounded first corners 47. Furthermore, the capacitor array 21c includes first opposed portions 34 and second opposed portions 37 having rounded second corners 48 located on the first lead portion 35 side and the second lead portion 38 side, respectively.

This configuration provides substantially the same advantages as that obtained from the capacitor array 21b shown in FIGS. 6A and 6B. With reference to FIG. 8, the first opposed portions 34 have third corners 49 located on the first projecting portion 36 side. The third corners 49 do not overlap with the second corners 48 and therefore internal stresses are effectively prevented from being concentrated at these corners.

The corners of the second opposed portions 37 that are located on the second projecting portion 39 side and the corners of the first opposed portions 34 that are located on the first lead portion 35 side have substantially the same configuration.

The configuration described with reference to FIGS. 7A, 7B, and 8 is also applicable to the capacitor array 21a shown in FIGS. 5A and 5B.

The capacitor arrays described above are examples of a monolithic ceramic electronic component according to a preferred embodiment of the present invention. Advantages of preferred embodiments of the present invention are particularly useful in the capacitor arrays. This is because the capacitor arrays include the ceramic laminates including the internal electrodes, the internal electrodes are not combined but are spaced from each other, a large number of surrounding portions are present around the internal electrodes, and therefore large internal stresses are likely to occur in the capacitor arrays.

The present invention is not limited to the capacitor arrays and can be applied to various monolithic ceramic electronic components, such as two-terminal monolithic capacitors, monolithic thermistors, and monolithic inductors, for example.

EXAMPLES

Examples of various preferred embodiments of the present invention will now be described.

Samples were prepared in an example of a preferred embodiment of the present invention on the basis of the design of the capacitor array 21c, shown in FIGS. 7A, 7B, and 8, according to the fourth preferred embodiment.

A ceramic slurry including a $BaTiO_3$-based ceramic powder was formed into sheets, which were dried, whereby ceramic green sheets were prepared. A conductive paste including Ni was applied on the ceramic green sheets by screen printing, whereby conductive paste coatings to be converted into predetermined internal electrodes having projecting portions were formed on the ceramic green sheets.

The ceramic green sheets were stacked and then pressed, whereby a mother laminate was prepared. The mother laminate was cut into a green ceramic laminate. The green ceramic laminate was fired at a temperature of up to about 1,200° C. for about two hours.

A conductive paste including Cu was applied on side surfaces of the resulting ceramic laminate and then baked at a temperature of up to about 850° C. for about one hour, whereby base conductive layers forming external terminal electrodes were formed. Ni plating layers and Sn plating layers were formed on the base conductive layers in that order.

The samples were prepared as described above. The samples had dimensions of about 2.0 mm×about 1.25 mm×about 0.85 mm and included the internal electrodes and 250 effective ceramic layers having a thickness of about 1.6 μm. The internal electrodes had a thickness of about 1.0 μm.

Furthermore, samples were prepared in a comparative example by substantially the same process as described above except that internal electrodes included in these comparative examples did not include projecting portions.

Ten thousand of the samples of the example and ten thousand of the samples of the comparative example were subjected to a humidity loading test under the following conditions: a temperature of about 40° C., a humidity of about 95%, a voltage of about 10 V, and a time of about 1,000 hours. Each sample was measured for insulation resistance (IR) with Agilent Technologies 4349B 4-Channel High Resistance Meter. The samples having an insulation resistance of less than about $10^6 \Omega$ were regarded as having cracks and therefore were determined to be defective. Seven of the samples of the comparative example were determined to be defective. In contrast, none of the samples of the example were determined to be defective.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A monolithic ceramic electronic component comprising:
    a ceramic laminate including a plurality of stacked ceramic layers and having a first principal surface, a second principal surface opposed to the first principal surface, a first side surface, and a second side surface opposed to the first side surface;
    first external terminal electrodes arranged on the first side surface;
    second external terminal electrodes arranged on the second side surface;
    first internal electrodes arranged in the ceramic laminate; and
    second internal electrodes arranged in the ceramic laminate; wherein
    the first internal electrodes include first opposed portions opposed to the second internal electrodes with one of the ceramic layers disposed therebetween, first lead portions which extend from the first opposed portions to the first side surface and which are electrically connected to the first external terminal electrodes, and first projecting portions which extend from the first opposed portions toward the second external terminal electrodes arranged on the second side surface but which do not extend to the second side surface;
    the second internal electrodes include second opposed portions opposed to the first internal electrodes with one of the ceramic layers disposed therebetween, second lead portions which extend from the second opposed portions to the second side surface and which are electrically connected to the second external terminal electrodes, and second projecting portions which extend from the second opposed portions toward the first external terminal electrodes arranged on the first side surface but which do not extend to the first side surface;
    the first lead portions have a width less than that of the first opposed portions;
    the second lead portions have a width less than the second opposed portions;
    both sides of each first projecting portion are located outside both sides of each second lead portion that is opposed to the first projecting portion with one of the ceramic layers disposed therebetween; and
    both sides of each second projecting portion are located outside both sides of each first lead portion that is opposed to the second projecting portion with one of the ceramic layers disposed therebetween.

2. The monolithic ceramic electronic component according to claim 1, wherein the first and second internal electrodes are alternately arranged in a direction in which the ceramic layers are stacked.

3. The monolithic ceramic electronic component according to claim 1, wherein a plurality of pairs of the first and second internal electrodes are arranged substantially parallel to the first and second principal surfaces of the ceramic laminate.

4. The monolithic ceramic electronic component according to claim 3, wherein the first internal electrodes are arranged in a single plane and the second internal electrodes are arranged in a single plane that is different from the plane in which the first internal electrodes are arranged.

5. The monolithic ceramic electronic component according to claim 3, wherein the first and second internal electrodes are alternately arranged in a single plane.

6. The monolithic ceramic electronic component according to claim 1, wherein each of the first and second projecting portions has rounded corners.

7. The monolithic ceramic electronic component according to claim 1, wherein each of the first and second opposed portions has rounded corners located on the first lead portion side and the second lead portion side, respectively.

* * * * *